United States Patent [19]

Nelson et al.

[11] Patent Number: 5,640,079

[45] Date of Patent: Jun. 17, 1997

[54] BATTERY CHARGER FOR PORTABLE RECHARGEABLE BATTERIES

[75] Inventors: Robert N. Nelson, Scottsdale; Roger R. Baum, Tempe, both of Ariz.

[73] Assignee: Andrew Corporation, Orland Park, Ill.

[21] Appl. No.: 297,234

[22] Filed: Aug. 29, 1994

[51] Int. Cl.[6] .............................. H01M 10/44; H02J 7/04
[52] U.S. Cl. .................................. 320/21; 320/30
[58] Field of Search ............................ 320/21, 22, 30, 320/35, 39; 429/61

[56] References Cited

U.S. PATENT DOCUMENTS

| | | | |
|---|---|---|---|
| 4,081,739 | 3/1978 | Gahler | 320/32 |
| 4,209,736 | 6/1980 | Reidenbach | 320/22 |
| 4,426,612 | 1/1984 | Wicnienski et al. | 320/39 |
| 4,549,127 | 10/1985 | Taylor. | |
| 4,583,034 | 4/1986 | Martin. | |
| 4,629,965 | 12/1986 | Fallon et al.. | |
| 4,670,703 | 6/1987 | Williams | 320/22 |
| 4,703,247 | 10/1987 | Morioka | 320/13 |
| 4,727,306 | 2/1988 | Misak et al. | 320/35 |
| 4,806,840 | 2/1989 | Alexander et al. | 320/20 |
| 4,845,419 | 7/1989 | Hacker | 320/39 |
| 4,850,006 | 7/1989 | Sasaki et al.. | |
| 4,910,103 | 3/1990 | Yoshikawa et al. | 429/61 |
| 4,983,904 | 1/1991 | Iwahashi. | |
| 5,061,898 | 10/1991 | Oram. | |
| 5,129,098 | 7/1992 | McGirr et al.. | |
| 5,172,045 | 12/1992 | Takeyasu. | |
| 5,204,611 | 4/1993 | Nor et al. | 320/21 |
| 5,254,931 | 10/1993 | Martensson | 320/22 |
| 5,289,103 | 2/1994 | Eccleston. | |
| 5,325,040 | 6/1994 | Bogut et al. | 320/22 |
| 5,331,268 | 7/1994 | Patino et al. | 320/20 |

FOREIGN PATENT DOCUMENTS

| | | |
|---|---|---|
| 0359237 | 3/1990 | European Pat. Off.. |
| 054633 | 11/1992 | European Pat. Off.. |
| 0600234 | 10/1993 | European Pat. Off.. |
| 0616411 | 3/1994 | European Pat. Off.. |
| 482840 | 3/1990 | U.S.S.R.. |
| 1219324 | 1/1968 | United Kingdom. |
| 2185326 | 7/1987 | United Kingdom. |

OTHER PUBLICATIONS

L. Bowen. R. Zarr, S. Denton, *A Microcontroller Controlled Battery Fuell Gauge and Charger.*, Proceedings of the Ninth Annual Battery Conference on Applications and Advances, *Jan.11–13, 1994*, pp. 179–181.

General Electric 2nd Ed. Nickel–Cadmium Batter Appln. Eng. Handbook, Publn. GET–3148A.

Ganssle "Marine Electrical Systems", Ocean Navigator No. 32, May 1990.

Cummings et al. "Charge batteries safely in 15 minutes by detecting voltage infection points", EDN, Sep. 1, 1994.

*Primary Examiner*—Peter S. Wong
*Assistant Examiner*—Gregory J. Toatley, Jr.
*Attorney, Agent, or Firm*—Arnold, White & Durkee

[57] ABSTRACT

The method of charging a portable rechargeable battery produces an electrical signal representing the battery output voltage. Rapid charging of the battery is initiated by supplying a high charging current to the battery when a signal representing the battery output voltage drops below a preselected lower threshold. The battery voltage at this lower threshold is high enough to maintain the operation of a device powered by the battery. The rapid charging of the battery is terminated after the signal representing the battery output voltage rises to a preselected upper threshold. The battery voltage at the upper threshold is substantially below the output voltage of a battery that is charged to 100% of its nominal capacity.

28 Claims, 2 Drawing Sheets

5,640,079

BATTERY CHARGER FOR PORTABLE RECHARGEABLE BATTERIES

FIELD OF THE INVENTION

The present invention relates to battery charging systems for charging portable rechargeable batteries, such as the batteries used in portable cellular telephones. Such batteries are typically either nickel-cadmium or nickel-metal hydride.

SUMMARY OF THE INVENTION

It is a primary object of the present invention to provide an improved battery charging system which rapidly but safely charges portable rechargeable batteries over a wide variety of operating conditions. The different conditions may include a wide range of ambient temperatures and humidities, vehicle electrical systems which supply widely varying input voltages to the charging system, and batteries made by a variety of different manufacturers, having different sizes, capacities and charging characteristics.

One particularly important objective of this invention is to provide such an improved charging system which permits the battery to maintain operation of the cellular telephone or other device powered by the battery during the entire time the battery is being charged.

A specific object of this invention is to provide such an improved battery system which charges the battery rapidly while protecting the battery from damage due to overcharging. In this connection, a related object is to provide such an improved charging system which automatically compensates for changes in temperature or changes in the input voltage supplied by the vehicle electrical system.

A further object of this invention is to provide such an improved battery charging system which utilizes the inherent characteristics of the battery to compensate for use of the battery while the charging is in progress.

Yet another object of this invention is to provide such an improved battery charging system which operates at a high level of efficiency during the rapid charging portion of a charging cycle and thus avoids the need for elaborate heat sinks.

Still another object of the invention is to provide a battery charging system which provides improved protection against overcharging of the battery.

Other objects and advantages of the invention will be apparent from the following detailed description and the accompanying drawings.

In accordance with the present invention, the foregoing objectives are realized by providing a battery charging system which monitors the battery output voltage and initiates rapid charging of the battery by supplying a high charging current to the battery when the battery output voltage drops below a preselected lower threshold voltage. The lower threshold voltage is high enough to maintain the operation of a device powered by the battery. After the battery output voltage rises to a preselected upper threshold voltage, the rapid charging is terminated. In the preferred embodiment of the invention, the rapid charging is continued for a preselected time interval after the upper threshold voltage is reached, and rapid charging is terminated when the preselected time interval expires. After rapid charging is terminated, charging of the battery preferably continues at a trickle rate. The threshold voltages are preferably automatically adjusted to compensate for variations in temperature and variations in the input voltage supplied to the charging system.

DETAILED DESCRIPTION OF THE PREFERRED EMBODIMENTS

Figure 1:
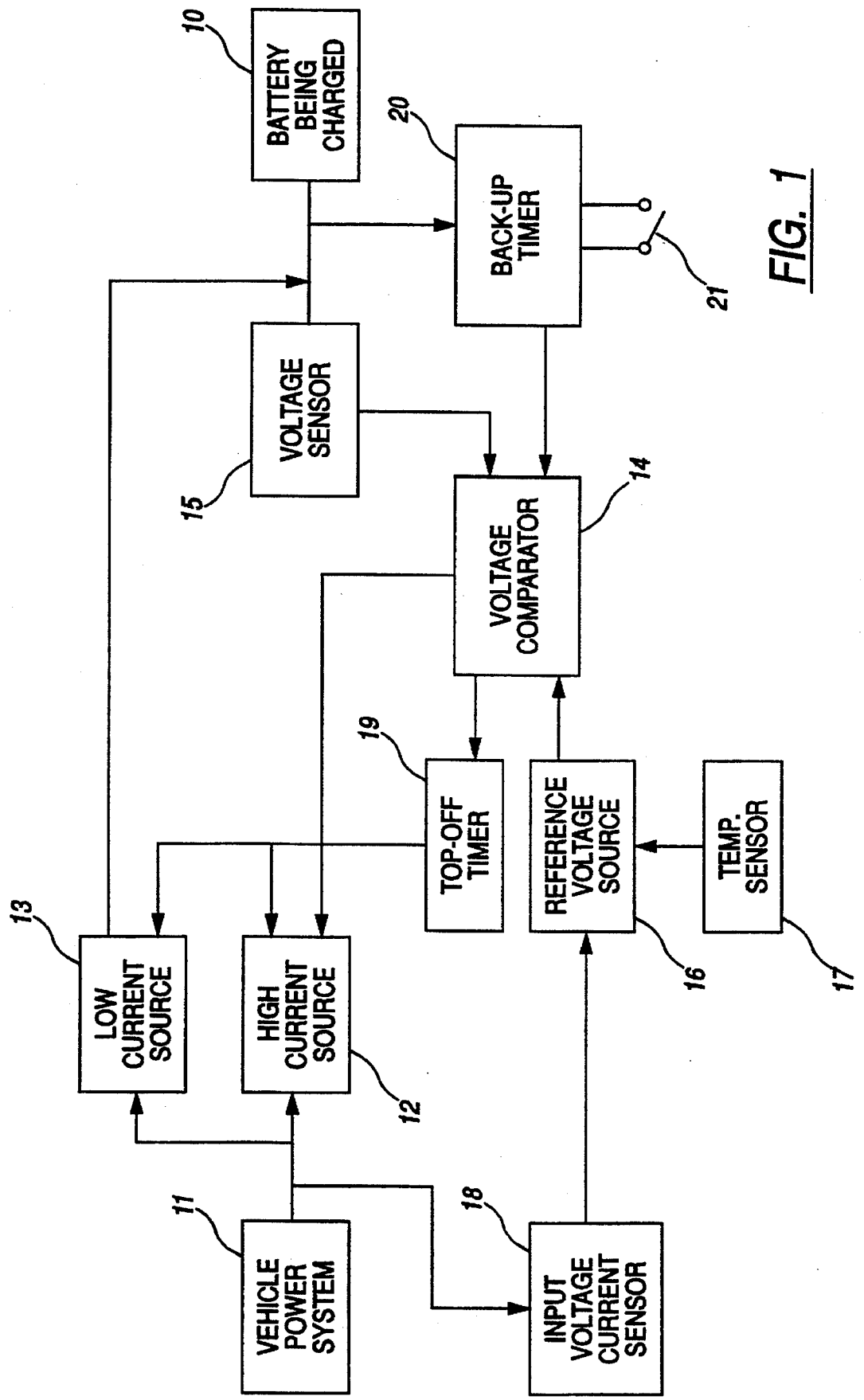
FIG. 1 is a block diagram of a battery charging system embodying the invention.

While the invention is susceptible to various modifications and alternative forms, specific embodiments thereof have been shown by way of example in the drawings and will be described in detail herein. It should be understood, however, that it is not intended to limit the invention to the particular forms disclosed, but, on the contrary, the intention is to cover all modifications, equivalents, and alternatives falling within the scope of the invention as defined by the appending claims.

Turning now to the drawings and referring first to FIG. 1, there is shown a battery charging system for charging a portable rechargeable battery 10 from the electrical system 11 of a conventional vehicle. Typically the power for the charging system is derived from the cigarette lighter socket in a vehicle. The nominal voltage supplied to the charging system by the vehicle electrical system 11 is typically 13.8 volts, but in actual practice this input voltage can vary over a range from about 10.5 volts to about 33 volts. The illustrative charging system includes two constant-current charging sources 12 and 13 for supplying a charging current to the battery 10. Both of the sources 12 and 13 are powered by the vehicle electrical system 11. The source 12 is a high-current source which supplies a relatively high charging current, e.g., 700 ma., for rapidly charging the battery. The second source 13 is a low-current source which supplies a relatively low charging current, e.g. 25 ma., for charging the battery at a trickle rate. The low-current source 13 operates continuously whenever the battery charging system is connected between the vehicle electrical system 11 and the battery 10. The high-current source 12, however, operates only when it is turned on by a voltage comparator 14.

The comparator 14 continuously compares the output voltage of the battery 10, as determined by a voltage sensor 15, with a reference voltage from a reference voltage source 16. As described in detail below, the reference voltage is used to determine when the battery output voltage monitored by the sensor 15 represents a predetermined percentage of charge, because the relationship between cell voltage and percent of charge capacity is well known for portable rechargeable batteries.

As the temperature of a rechargeable battery increases, due to a change in ambient temperature or prolonged charging or both, the cell voltage at any given charge input (usually expressed as a percentage of the nominal capacity of the battery) decreases. Consequently, the value of the reference voltage from the source 16 is preferably adjusted as a function of one or more sensed temperatures so that the value of this reference voltage will be more representative of a specified charge input over a wide range of temperature conditions. For example, a charge input of 50% might be represented by a reference voltage of 1.44 volts when the battery is being charged at a temperature of 25° C., but if the temperature increases to 60° C., a charge input of 50% might be represented by a reference voltage of only 1.4 volts. To compensate for such variations, the output of the reference voltage source 16 is continuously adjusted by the output from a temperature sensor 17. This sensor 17 may be located to simply sense ambient temperature, which is one of the major factors affecting the battery temperature, or the sensor may be located to provide a more direct indication of the battery temperature. For example, the sensor can be the thermistor that is conventionally included in the battery-operated circuitry of a cellular telephone, or the sensor could be located close to, or even attached to, the case of the battery.

If desired, multiple temperature sensors can be used, with the outputs of the sensors being combined to provide a compensating input signal to the reference voltage source 16. The charging system of the present invention, however, is particularly useful with an ambient temperature sensor, which is most convenient for a universal charger that is easy to use with any rechargeable battery and any device operated by that battery. The safeguards that are included in the charging system of this invention permit the use of an ambient temperature sensor without jeopardizing the battery or the reliability of the charging system, as will be described in more detail below.

It is also desirable to adjust the output of the reference voltage source 16 as a function of the input voltage supplied by the vehicle electrical system 11, which can vary over a relatively wide range in actual operation. Variations in the input voltage supplied to the charger have a small but significant effect on the magnitude of the charging current, which in turn can raise or lower the battery voltage by one or two tenths of a volt. To compensate for these variations, an input voltage current sensor 18 monitors the input to the charging system from the vehicle electrical system 11, and continuously adjusts the reference voltage from the source 16 in response to variations in the input voltage.

The voltage comparator 14 continuously compares the terminal voltage of the battery being charged, as monitored by the voltage sensor 15, and a threshold value set by the output of the reference voltage source 16. The lower threshold voltage is selected to correspond to a charge input of about 50% of the nominal capacity of the battery, and the upper threshold voltage is selected to correspond to a charge input of about 70% of the nominal capacity of the battery.

As the battery 10 is used and discharged, its terminal voltage (monitored by the sensor 15) eventually drops to the level of the lower threshold voltage. When the battery voltage drops below the lower threshold level set by the output of the reference voltage source 16, the comparator 14 responds by producing an output signal which turns on the high-current source 12. The resulting high-current output from the source 12 charges the battery 10 at a fast rate until source 12 is turned off. Because this fast charge is initiated before the battery has been discharged to the point where it can no longer be used to operate the cellular telephone or other device powered by the battery, the operation of the telephone or other device is not interrupted by the charging operation.

It will be appreciated that if a battery that is already below the 50% charge level is connected to the charging system, the comparator 14 will immediately detect that condition and turn on the high-current source 12 to rapidly charge the battery. Thus, the battery will quickly be brought up to a charge level sufficient to operate the device that it is supporting, and rapid charging will continue while that device is in use.

Each time the comparator 14 turns on the high-current source 12, the threshold level set by the output of the source 16 is increased to the preselected upper threshold voltage. The same effect may be achieved by artificially changing the battery voltage input to the comparator by an mount equal to the desired differential between the upper and lower thresholds, while maintaining a fixed reference voltage input.

When the battery 10 has been charged to approximately 70% of its nominal capacity, the battery terminal voltage monitored by the sensor 15 rises to the level of the upper threshold voltage. At this point the comparator 14 produces an output signal to a top-off timer 19 to initiate the measurement of a preselected time period. This preselected time period is typically about 25 minutes, and is selected to be long enough to allow the high-current source 12 to increase the charge input from approximately 70% to approximately 80%, or even 85 to 90%, of the nominal capacity of the battery. When this time period expires, the top-off timer 19 produces an output signal which turns off the high-current sensor 12. The low-current source 13 then continues to charge the battery 10 at a trickle rate. The rationale for terminating the fast charge of the battery at 80 to 90% of the nominal capacity of the battery is to virtually eliminate any possibility of damaging the battery by overcharging the battery from the high-current source 12. Nickel-cadmium batteries are particularly susceptible to damage from overcharging. To provide further protection against such overcharging, a backup timer 20 measures a second, longer time interval each time the charger is connected to either the battery 10 or the vehicle electrical system 11. This second time interval can be adjusted by a switch 21 to allow the selection of different intervals for different types of batteries. A typical range for the time intervals that can be selected for the backup timer is 45 to 75 minutes. The backup timer 20 is reset whenever the charger is connected to either the vehicle electrical system 11 or the battery 10.

When the backup time interval measured by the timer 20 expires, the timer 20 produces an output signal which reduces the values of both the upper and lower threshold voltages. In most operating situations, this adjustment will reduce the upper threshold voltage to a value below the battery terminal voltage, which has the effect of terminating the fast-charge mode by turning off the high-current source 12 via the comparator 14. Thus the battery continues to be charged only in the trickle mode. For example, if the charger is connected to a battery in a condition such that the rapid charge does not raise the battery terminal voltage above the upper threshold value, under the existing ambient conditions, the rapid charge might continue beyond the time limit set by the backup timer. As mentioned previously, the reduction of the threshold voltages may be effected by either reducing reference voltages representing the desired threshold levels, or by artificially increasing the signal representing the battery voltage while maintaining the reference voltage fixed.

If the battery 10 continues to be discharged as the telephone or other device powered by the battery continues to be used, the battery voltage may eventually drop below the reduced lower threshold. In this event a fast-charge cycle will again be initiated by the comparator by turning on the high-current source 12, and the battery will be re-charged to the charge input level represented by the reduced upper threshold, plus the additional charge effected in the time interval measured by the top-off timer 19. Thus, the battery will not be as fully charged in this mode of operation as in normal operation, because of the reduced threshold values. Nevertheless, the battery will be maintained in a sufficiently high stab of charge to permit continuous operation of the telephone or other device powered by the battery.

Figure 2:
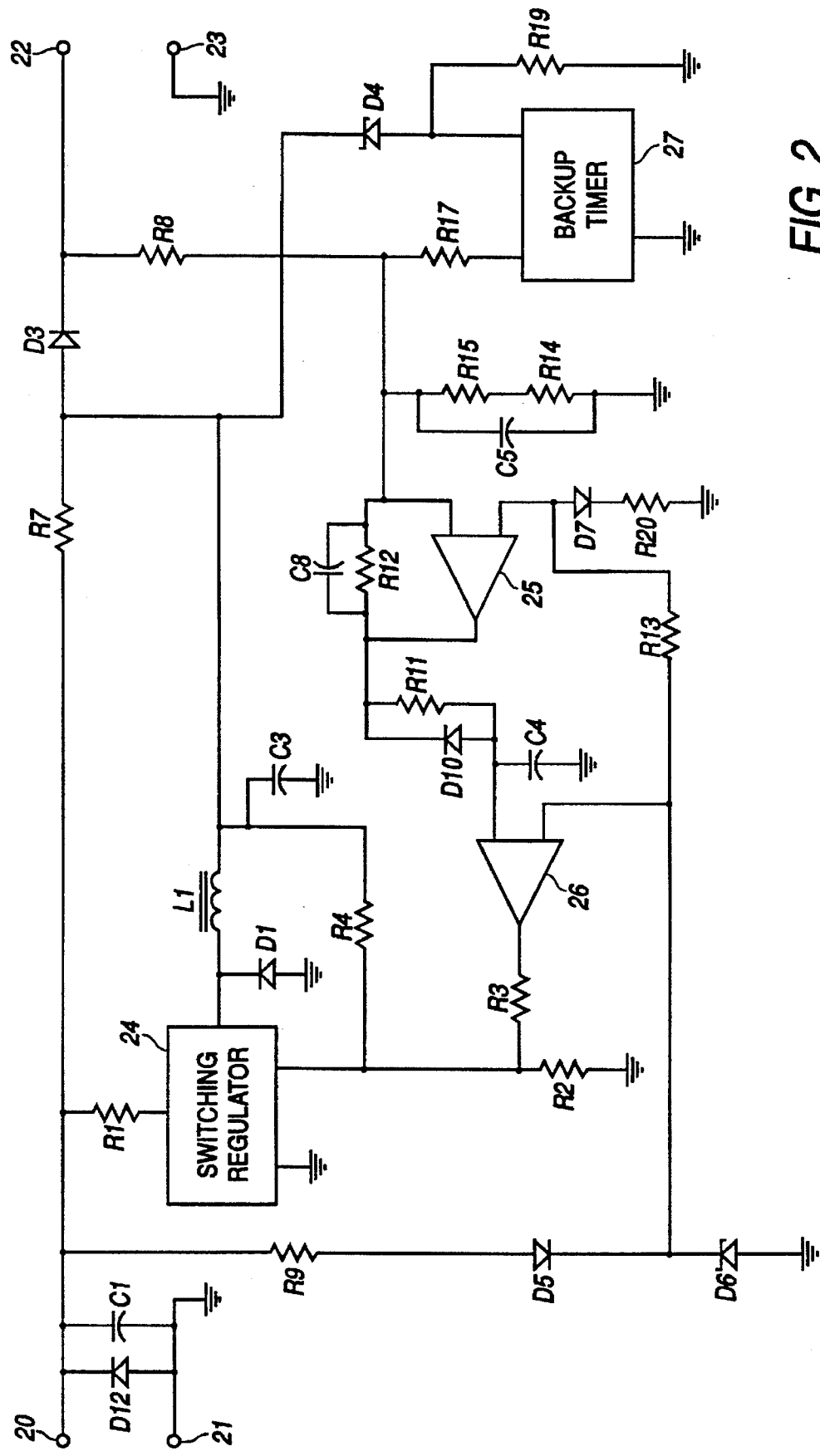
FIG. 2 is a schematic diagram of a prepared circuit for implementing the battery charging system of FIG. 1.

A preferred circuit for implementing the system of FIG. 1 is shown in FIG. 2. This circuit is connected to the vehicle electrical system at terminals 20 and 21, and to the battery at terminals 22 and 23. Power from the input terminals 20 and 21 is supplied to a switching regulator 24 through a resistor R1 which determines the magnitude of the current output from the regulator. The output of the regulator 24 is supplied to the output terminal 22 through an inductor L1 and a diode D3. The inductor L1 and a capacitor C3 form a filter which smooths the output of the regulator 24. The output terminal 22 also receives a trickle-charging current from the input terminals 20, 21 via a resistor R7 and the diode D3. As described above, the trickle current flows continuously, regardless of whether or not the switching regulator 24 is operating to supply the rapid-charging current. A catch diode D1 is connected from the output of the regulator 24 to ground.

The battery terminal voltage is monitored by a voltage-dividing circuit formed by three resistors R8, R15 and R14 in series, filtered by the addition of a capacitor C5 in parallel with the resistors R15 and R14. One input of a voltage comparator 25 is connected to a point between the resistors R8 and R15, so that this input of the comparator receives a voltage proportional to the battery terminal voltage. The reference voltage supplied to the second input of the comparator 25 is derived from a voltage divider formed by the series arrangement of a resistor R9, a diode D5, a resistor R13, a diode D7 and a resistor R20 between the input terminal 20 and ground. A zener diode D6 is connected in parallel with the resistors R13 and R20 and the diode D7. Because the voltage drop across this series circuit is the voltage supplied to the input terminals 20 and 21 from the electrical vehicle system, the level of the reference voltage supplied to the comparator 25 varies with fluctuations in the input voltage supplied to the terminals 20 and 21. These variations in the reference voltage compensate for variations in the input voltage supplied from the vehicle electrical system. As the input voltage from the vehicle electrical system increases or decreases, so does the reference voltage. Temperature compensation is provided by the diode D7, whose voltage drop varies as a function of the temperature of the diode.

As long as the battery voltage input to the comparator 25 is above the reference voltage input, the output of the comparator 25 is high, which maintains a charge on a capacitor C4. This supplies a high input voltage to a second voltage comparator 26, which receives a reference voltage at its other input from the zener diode D6. As long as the capacitor C4 remains charged, the output of the comparator 26 remains high. This output voltage is connected across a voltage divider formed by a pair of resistors R2 and R3, and provides a control input to the switching regulator 24. A high control input holds the regulator 24 off.

When the battery voltage input to the comparator 25 drops below the reference voltage input, the output of the comparator 25 goes low, which causes the capacitor C4 to discharge through a diode D10 and the comparator 25. The discharging of the capacitor C4 reduces the input voltage to the comparator 26, causing the output of that comparator to go low, which turns on the regulator 24. This initiates rapid charging of the battery.

When the output of the first comparator 25 is high, it produces a voltage drop across a feedback resistor R12, which has the effect of artificially increasing the battery input voltage to the comparator 25. When the output of the comparator 25 goes low, the artificial increase in the battery voltage input is removed, which has the same effect as raising the reference voltage input to an upper threshold level. Thus, the rapid charging of the battery will continue until the reduced battery voltage input signal to the comparator 25 rises above the reference voltage input.

The battery voltage signal eventually rises above the level of the reference voltage, which causes the output of the comparator 25 to go high again and charge the capacitor C4 through a resistor R11. The combination of the capacitor C4 and a voltage comparator 26 functions as the top-off timer. The top-off time interval is determined in part by the time required to charge the capacitor C4. After the output of the comparator 25 goes high, the capacitor C4 charges to the level of the reference voltage supplied to the comparator 26. When the charge on the capacitor C4 reaches the level of the reference voltage supplied to the comparator 26, the output of the comparator 26 goes high, and the resulting increase in the control voltage supplied to the switching regulator 24 causes the switching regulator to turn off. This terminates the fast charging of the battery, until the switching regulator 24 is turned on again.

After the switching regulator 24 has been turned off, the battery terminal voltage across the terminals 22 and 23 gradually diminishes, which eventually causes the output of the comparator 25 to go low again. The timing capacitor C4 then discharges again to turn on the regulator 24, repeating the cycle.

The resistor R12 and a capacitor C8 are connected in parallel with each other between the output and the battery voltage input of the comparator 25. The capacitor C8 accumulates a charge that varies with the battery terminal voltage, so that the top-off time interval is reduced as the battery voltage increases. When a cell is near a full charge, the internal cell resistance rises, which causes the cell to become spongy when current is applied and removed abruptly. The circuit of FIG. 2 exploits this effect to reduce the top-off time interval when operating with a battery which is at or near full charge, to provide additional protection against over-charging. In addition, toggling of the comparator 25 due to small variations of the battery voltage signal around the reference voltage is avoided by requiring a preselected voltage swing, e.g., 0.8 volt at the battery, to charge the output of the battery.

Whenever the battery-charging circuit is connected to either the vehicle electrical system or the battery, a backup timer 27 receives an increased voltage through a zener diode D4. This increased voltage is supplied to the reset input of the backup timer 27, so as to start measurement of a backup time interval. When the backup timer times out, it connects a resistor R17 to +5 volts to artificially increase the battery voltage input to the comparator 25. As described above, an artificial increase in the battery voltage input to the comparator 25 has the same effect as reducing the reference voltage. For example, an artificial increase in the battery voltage input to the comparator 25 by 0.3 volt has the same effect as reducing the reference voltage by 0.3 volt.

The control input of the regulator 24 also receives a feedback signal indicative of the output voltage of the regulator. This feedback signal is produced by connecting a resistor R4 between the control input of the regulator 24 and the battery side of the inductor L1. The value of the resistor R4 is such that the output voltage does not drop below 5.5 volts, so that the charger can also function as a battery eliminator when required.

While the invention has been described with particular reference to a charging system powered by a vehicle electrical system, the invention is also useful in charging systems that derive their power from other sources, such as a-c to d-c connectors that plug into wall sockets. For example, the ability to charge a portable battery with virtually no risk of overcharging, and while maintaining the operation of the device powered by the battery, is particularly useful in desk-top chargers for nickel-cadmium batteries (which are susceptible to damage from overcharging).

We claim:

1. A method of charging a portable rechargeable battery, said method comprising producing an electrical signal representing the battery output voltage, initiating rapid charging of the battery by supplying a high charging current to the battery when the signal representing the battery output voltage drops below a preselected lower threshold, the battery output voltage corresponding to said lower threshold being high enough to maintain the operation of a device powered by said battery, and terminating the rapid charging of the battery after the signal representing the battery output voltage rises to a preselected upper threshold, the battery output voltage corresponding to said upper threshold being substantially below the output voltage of a battery that is charged to 100% of its nominal capacity.

2. A method of charging a portable rechargeable battery, said method comprising:

producing an electrical signal representing the battery output voltage, initiating rapid charging of the battery by supplying a high charging current to the battery when the signal representing the battery output voltage drops below a preselected lower threshold, the battery output voltage corresponding to said lower threshold being high enough to maintain the operation of a device powered by said battery, starting the measurement of a preselected time interval when the signal representing the battery output voltage rises to a preselected upper threshold, the battery output voltage corresponding to said upper threshold being below the output voltage of a battery that is charged to 100% of its nominal capacity, and terminating the rapid charging of the battery and initiating a trickle charge by supplying a low charging current to the battery when said preselected time interval expires.

3. The method of claim 2 which includes the step of adjusting said preselected time interval in response to the magnitude of the battery output voltage.

4. The method of claim 2 which includes the steps of initiating the measurement of a backup time interval whenever the charging system is energized, and reducing said threshold voltages if said backup time interval expires before the charging system is de-energized.

5. The method of claim 4 wherein said backup time interval is adjustable to accommodate different types of batteries.

6. The method of claim 1 wherein said lower threshold corresponds to a voltage that is less than the output voltage of a battery which is charged to 50% of its nominal capacity.

7. The method of claim 1 which includes the steps of monitoring the ambient temperature, and adjusting at least said upper threshold to compensate for variations in said ambient temperature.

8. The method of claim 7 wherein both said upper and lower thresholds are adjusted to compensate for variations in said ambient temperature.

9. The method of claim 1 which includes the steps of monitoring the input voltage supplied to the charging system, and adjusting said thresholds to compensate for variations in said input voltage.

10. The method of claim 1 which includes the step of monitoring the battery temperature, and adjusting said thresholds to compensate for variations in said battery temperature.

11. The method of claim 1 wherein said upper threshold corresponds to a voltage that is greater than the output voltage of a battery which is charged to 70% of its nominal capacity.

12. The method of claim 1 wherein said upper threshold is reduced as the ambient temperature increases.

13. The method of claim 1 wherein the power for said charging current is derived from the electrical system of a vehicle.

14. The method of claim 1 wherein said upper threshold corresponds to a voltage that is below the output voltage of a battery that is charged to 90% of its nominal capacity.

15. The method of claim 1 which includes the step of continuing to charge the battery at a trickle rate by supplying a low charging current to the battery after the rapid charging is terminated.

16. A method of charging a portable rechargeable battery, said method comprising:

producing an electrical signal representing the battery output voltage, initiating rapid charging of the battery by supplying a high charging current to the battery when the signal representing the battery output voltage drops below a preselected lower threshold, the battery output voltage corresponding to said lower threshold being high enough to maintain the operation of a device powered by said battery, and continuing the rapid charging of the battery for a preselected time interval after the battery output voltage rises to a preselected upper threshold, the battery output voltage corresponding to said upper threshold being below the output voltage of a battery that is charged to 100% of its nominal capacity.

17. A method of charging a portable rechargeable battery, said method comprising:

producing an electrical signal representing the battery output voltage, initiating rapid charging of the battery by supplying a high charging current to the battery when the signal representing the battery output voltage drops below a preselected lower threshold, the battery output voltage corresponding to said lower threshold being high enough to maintain the operation of a device powered by said battery, and terminating the rapid charge of the battery after the signal representing the battery output voltage rises to a preselected upper threshold, the battery output voltage corresponding to said upper threshold being below the output voltage of a battery that is charged to 100% of its nominal capacity, wherein a difference between said upper and said lower thresholds is established by artificially increasing the level of said signal representing the battery output voltage when the battery is not being rapidly charged, and removing said artificial increase upon initiation of rapid charging of the battery.

18. A system for charging a portable rechargeable battery from the electrical system of a vehicle, said system comprising means for producing an electrical signal representing the battery output voltage, means for initiating rapid charging of the battery by supplying a high charging current to the battery when the signal representing the battery output voltage drops below a preselected lower threshold, the battery output voltage corresponding to said lower threshold being high enough to maintain the operation of a device powered by said battery, and means for terminating the rapid charging of the battery after the signal representing the battery output voltage rises to a preselected upper threshold.

19. A system for charging a portable rechargeable battery from the electrical system of a vehicle, said system comprising:

means for producing an electrical signal representing the battery output voltage, means for initiating rapid charging of the battery by supplying a high charging current to the battery when the signal representing the battery output voltage drops below a preselected lower threshold, the battery output voltage corresponding to said lower threshold being high enough to maintain the operation of a device powered by said battery, means for starting the measurement of a preselected time interval when the signal representing the battery output voltage rises to a preselected upper threshold, and means for terminating the rapid charging of the battery and initiating a trickle charge by supplying a low charging current to the battery when said preselected time interval expires.

20. The system of claim 19 which includes means for initiating the measurement of a backup time interval when said rapid charging of the battery is initiated, and reducing said threshold voltages if said backup time interval expires before said preselected time interval expires.

21. The system of claim 20 which includes means for adjusting said backup time interval to accommodate different types of batteries.

22. The system of claim 18 wherein said lower threshold voltage is less than the output voltage of a battery which is charged to 50% of its nominal capacity.

23. The system of claim 18 which includes means for monitoring the ambient temperature, and adjusting at least said upper threshold voltage to compensate for variations in said ambient temperature.

24. The system of claim 23 wherein said upper threshold corresponds to a voltage that is greater than the output voltage of a battery which is charged to 70% of its nominal capacity.

25. The system of claim 23 which includes means for reducing said upper threshold as said ambient temperature increases.

26. The system of claim 23 which includes means for adjusting both said upper and lower thresholds to compensate for variations in said ambient temperature.

27. The system of claim 18 which includes means for monitoring the input voltage supplied by the vehicle electrical system, and adjusting said thresholds to compensate for variations in said input voltage.

28. The system of claim 18 which includes means for monitoring the battery temperature, and adjusting said thresholds to compensate for variations in said battery temperature.

* * * * *